United States Patent [19]

Yoshie et al.

[11] Patent Number: 5,157,390
[45] Date of Patent: Oct. 20, 1992

[54] METHOD FOR PROVIDING NETWORK SERVICE IN A COMMUNICATION SYSTEM

[75] Inventors: Tatsuo Yoshie, Tokyo; Tetsuo Takemura; Yutaka Fukushima, both of Yokohama; Fumito Sato, Hanno, all of Japan

[73] Assignees: Hitachi, Ltd.; Nippon Telegraph and Telephone Corporation, both of Tokyo, Japan

[21] Appl. No.: 505,568

[22] Filed: Apr. 6, 1990

[30] Foreign Application Priority Data

Apr. 17, 1989 [JP] Japan .................................. 1-95116

[51] Int. Cl.⁵ .............................................. H04B 1/00
[52] U.S. Cl. ............................ 340/825.52; 340/825.08
[58] Field of Search ...................... 340/825.08, 825.52; 379/94, 201, 207, 221, 225; 370/85.9, 85.13, 85.14

[56]   References Cited
U.S. PATENT DOCUMENTS

| | | | |
|---|---|---|---|
| 4,510,492 | 4/1985 | Mori et al. | 340/825.05 |
| 4,757,267 | 7/1988 | Riskin | 379/201 |
| 4,811,388 | 3/1989 | Westerhof et al. | 379/207 |
| 4,899,373 | 2/1990 | Lee et al. | 379/201 |
| 4,941,084 | 7/1990 | Terada et al. | 340/825.52 |
| 4,959,854 | 9/1990 | Cave et al. | 379/201 |

FOREIGN PATENT DOCUMENTS 63-54841  3/1988  Japan .

*Primary Examiner*—Donald J. Yusko
*Assistant Examiner*—Dervis Magistre
*Attorney, Agent, or Firm*—Antonelli, Terry, Stout & Kraus

[57]         ABSTRACT

When one module provides service while using a service providing function of other module, the service requesting module sends out a service request to other modules in a broadcast fashion. Each module receives and detects the service request, and when there is a corresponding service providing function in its own module, it sends a response back to the requesting module. Among a plurality of nodes, a selection function module which stores service providing function arrangement information of other nodes and determines a node which has the function for the corresponding service request is provided. The selection function module sends back a response to the service request.

12 Claims, 14 Drawing Sheets

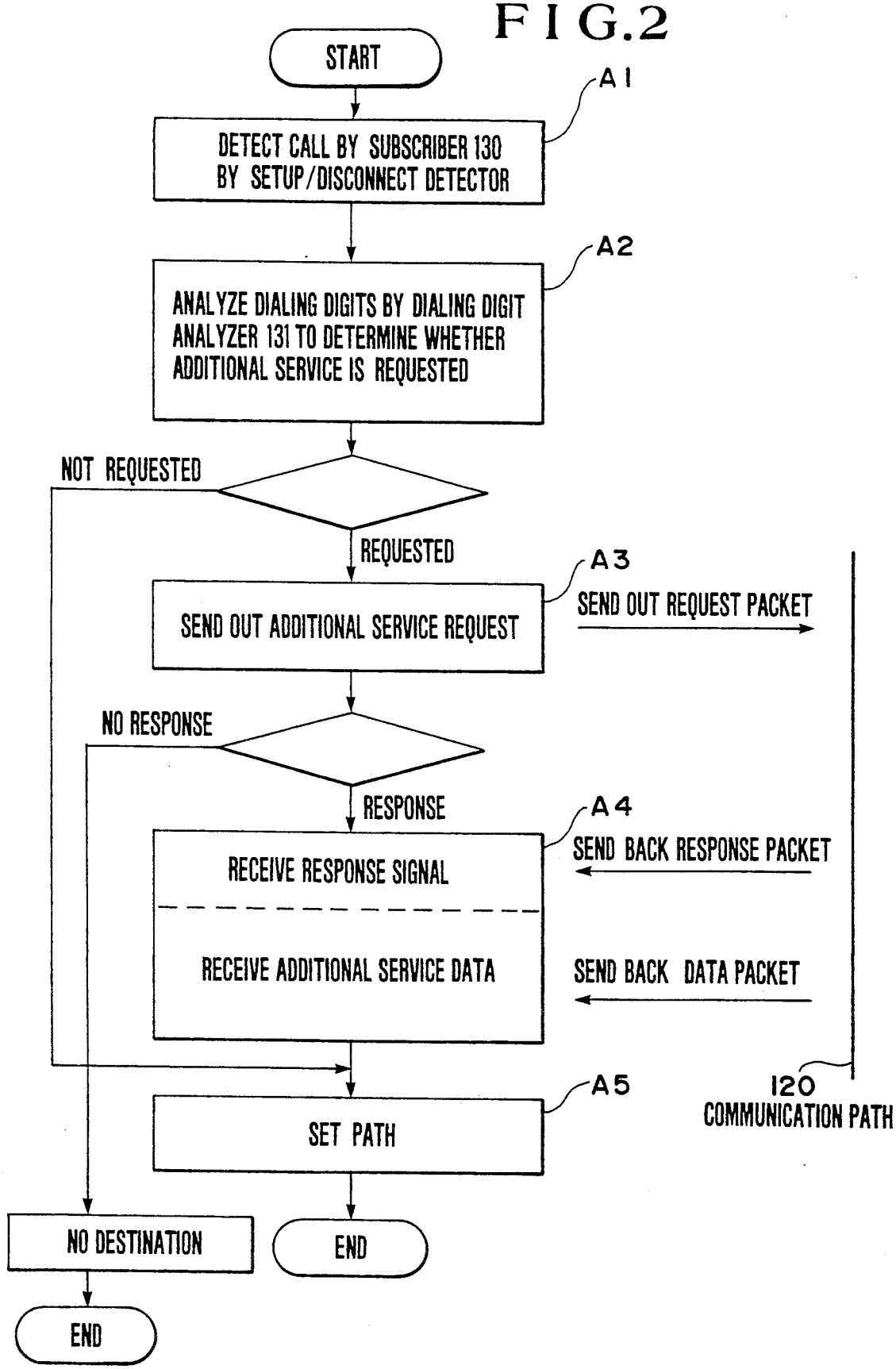

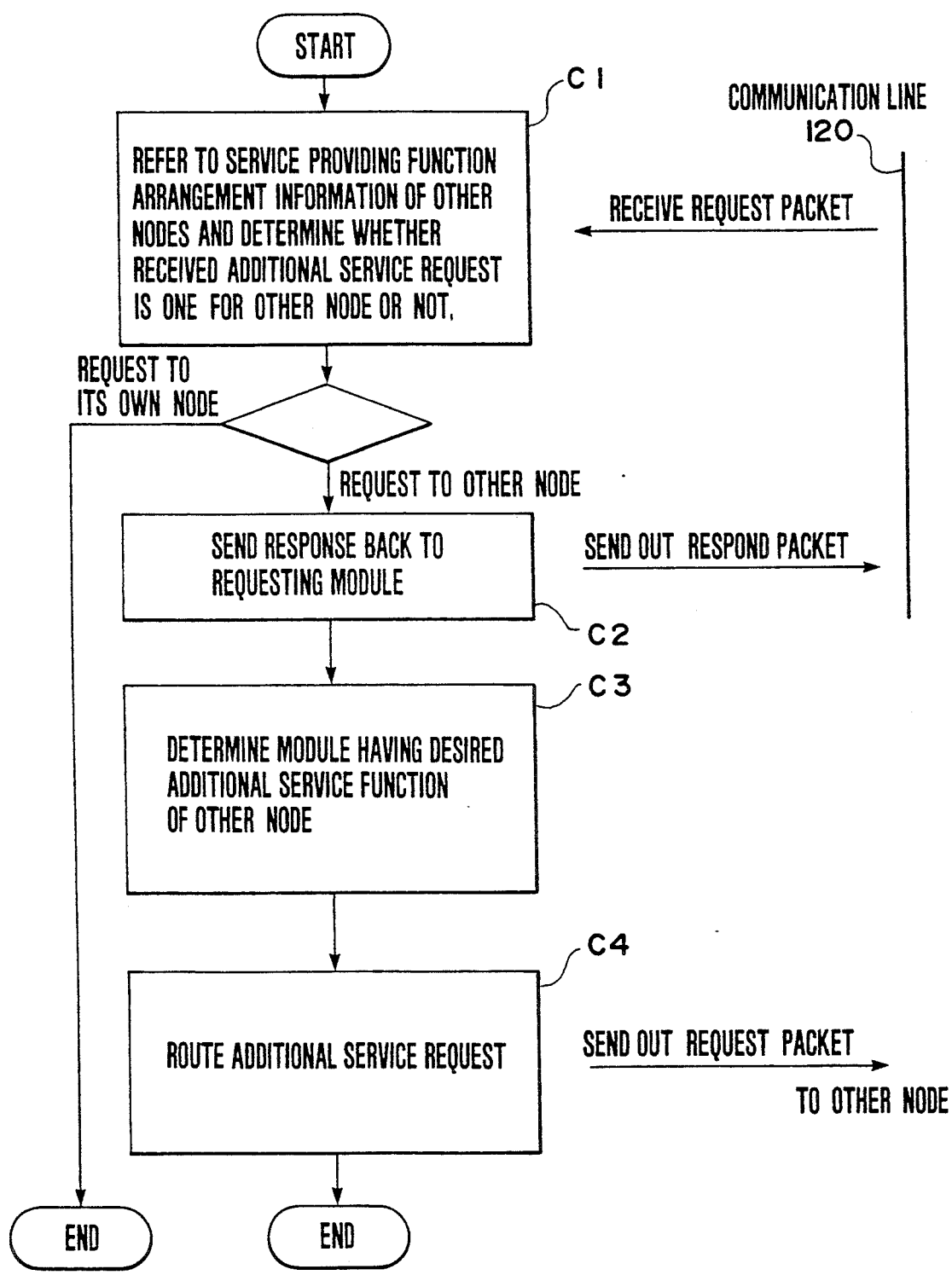

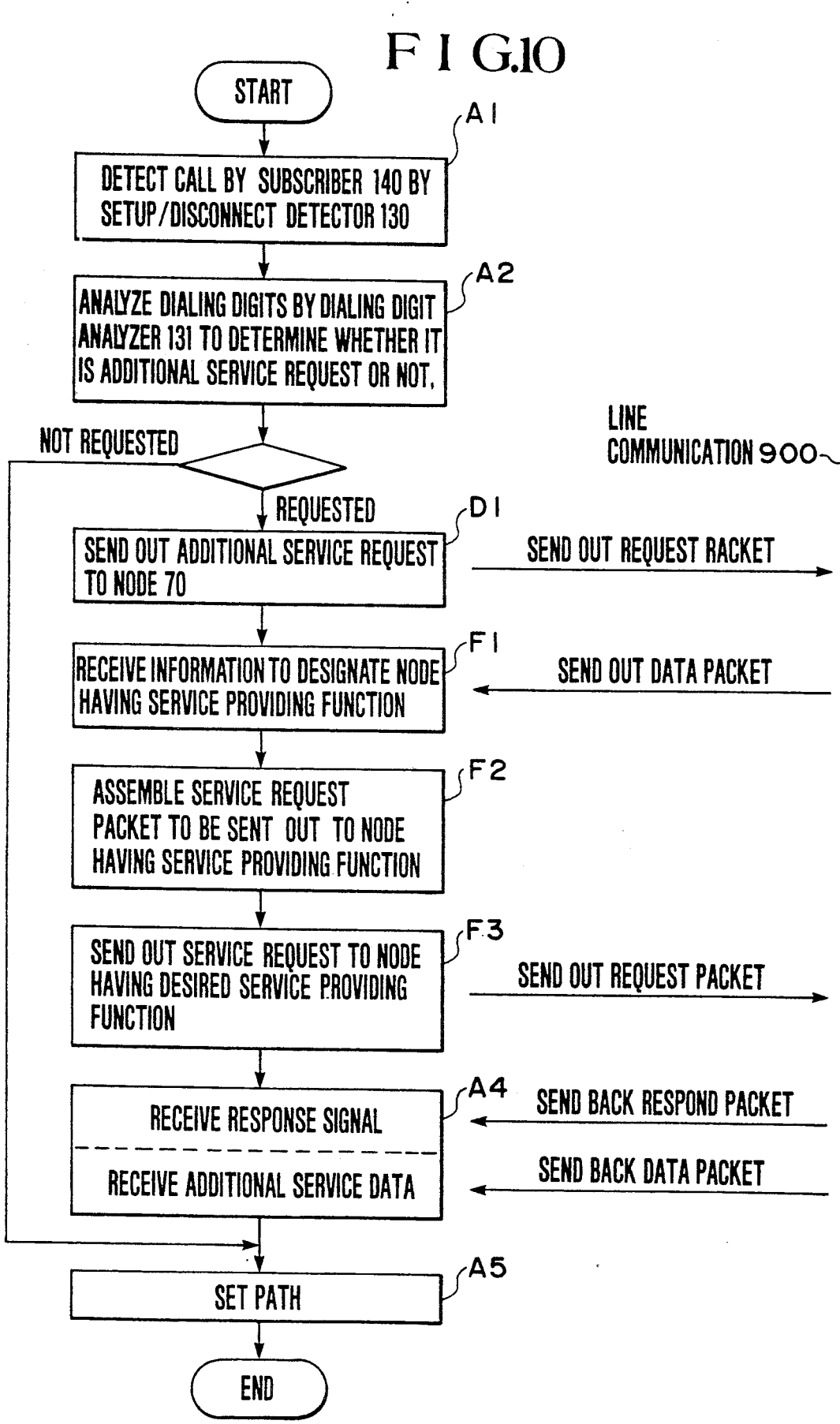

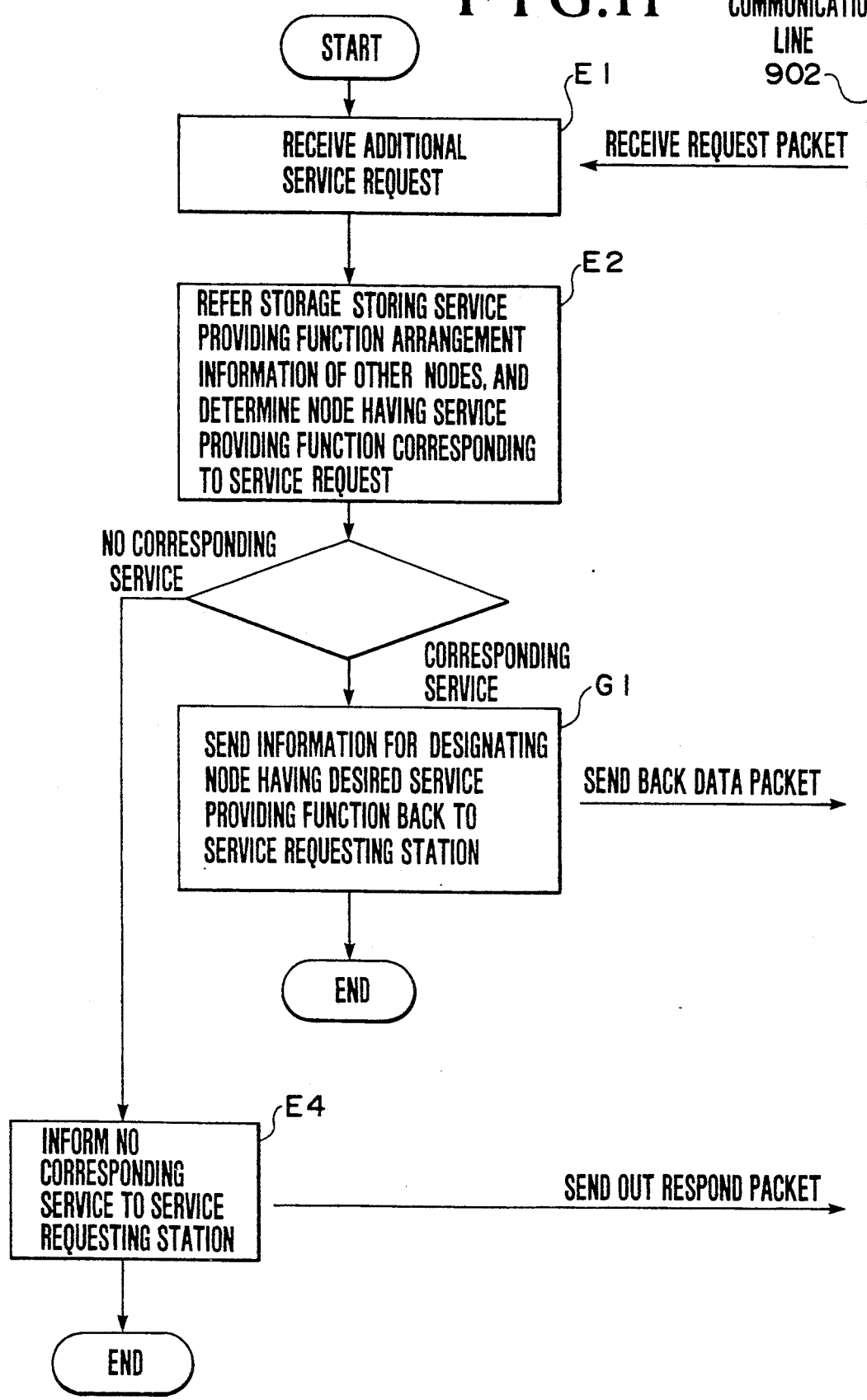

METHOD FOR PROVIDING NETWORK SERVICE IN A COMMUNICATION SYSTEM

BACKGROUND OF THE INVENTION

The present invention relates to a communication system in a communication network, and more particularly to a method for providing network service suitable for providing service by one module while using a function of another module in a communication network comprising a plurality of modules.

A communication network comprises a number of nodes for relaying and switching calls and modifying information, such as a telephone station or an information processing center. Further, each of such nodes comprises various modules including a module having a call processing function for switching a call, such as a switching unit, and a module having an operation function for maintaining, operating and controlling communication apparatus, such as a monitor and test unit. Such an arrangement is found in a network comprising a plurality of local area networks (LAN's). Namely, one LAN functions as a node, and a server or a workstation of each LAN functions as a module. In such a communication network, when the network provides service, as disclosed in JP-A-63-54841, if a sending module knows a logical address and a physical address of a destination module, the sending module first translates the logical address of the destination module which it uses in internal processing to a physical address and provides the service while communicating with the destination module through a communication line.

In the above prior art, it is necessary that the sending module has previously registered and known the logical address and the physical address of the destination module, and re-registration is required when the destination module is added or the physical address is altered. As a result, where there are many destination modules, the address management of the entire network is complex and lacks flexibility which causes difficulty in operation. If the number of destination modules increases to a point where they exceed a capacity of a table in which the addresses have been registered, it becomes necessary to increase the table capacity, which is inconvenient.

SUMMARY OF THE INVENTION

It is an object of the present invention to provide a method for providing flexible network service which is not accompanied with a change in a sending module.

It is another object of the present invention to provide a method for providing network service which does not cause complexity in address management of the modules even if the number of destination modules is large.

It is another object of the present invention to increase the speed of response to a service request where a module having a function requested by a sending module is in a different node.

In order to achieve the above objects, in accordance with the present invention, where service is provided by utilizing a service providing function of another module, the sending module does not manage address information of the destination modules individually and independently. A service requesting module sends out a service request to other modules in a broadcast fashion. Each of the other modules receives and discriminates the service request, and if there is a corresponding service providing function in its own module, it sends back a response to the requesting module. Further, among nodes, a selection function module which stores service providing function arrangement information of other nodes to determine a node having a function for the corresponding service request is provided. The selection function module sends back a response to the service request.

BRIEF DESCRIPTION OF THE DRAWINGS

FIG. 2 shows a flow chart for explaining an operation of one embodiment of the present invention when an additional service providing function of a module in a node is utilized, FIG. 5 shows a flow chart for explaining an operation of an embodiment of the present invention when an additional service providing function of a module in other node is utilized, FIGS. 10 and 11 show flow charts for explaining an operation of an embodiment of the present invention in the network shown in FIG. 9.

DETAILED DESCRIPTION OF THE PREFERRED EMBODIMENTS

A first embodiment of the present invention is first explained with reference to FIGS. 1A, 1B and 2.

Figure 1A:
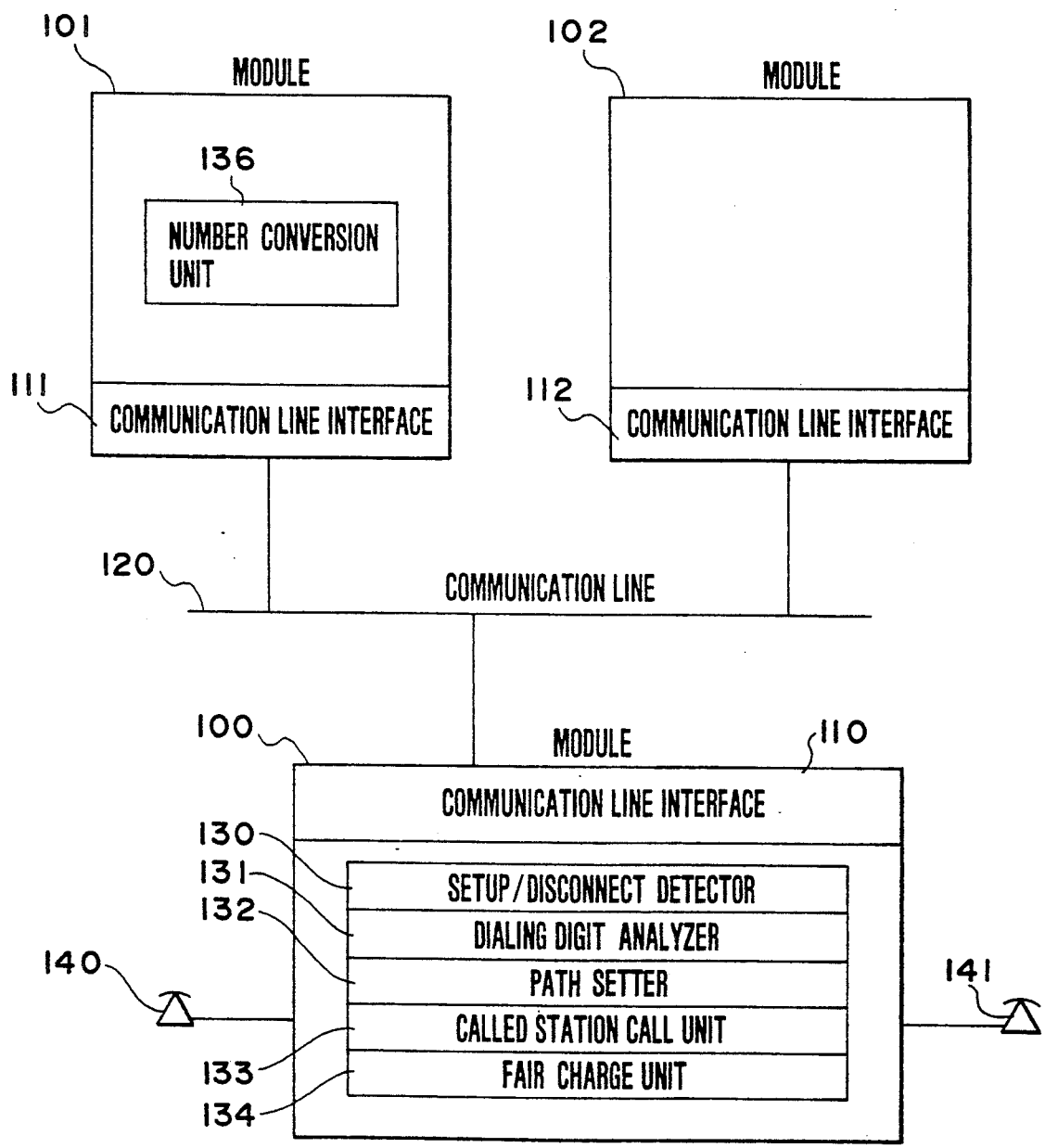
FIG. 1A shows a configuration of a node comprising a plurality of modules.

FIGS. 1A shows a configuration of one node. Modules 100-102 are interconnected by a communication line 120. Other modules are also connected to the communication line 120 although they are not shown. Each module communicates with other modules through communication line interfaces 110-112.

The module 100 has basic functions of a telephone switching unit, that is, a setup/disconnect detector 130, a dialing digit analyzer 131, a path setter 132, a called station calling unit 133 and a fair charging unit 134.

Figure 1B:
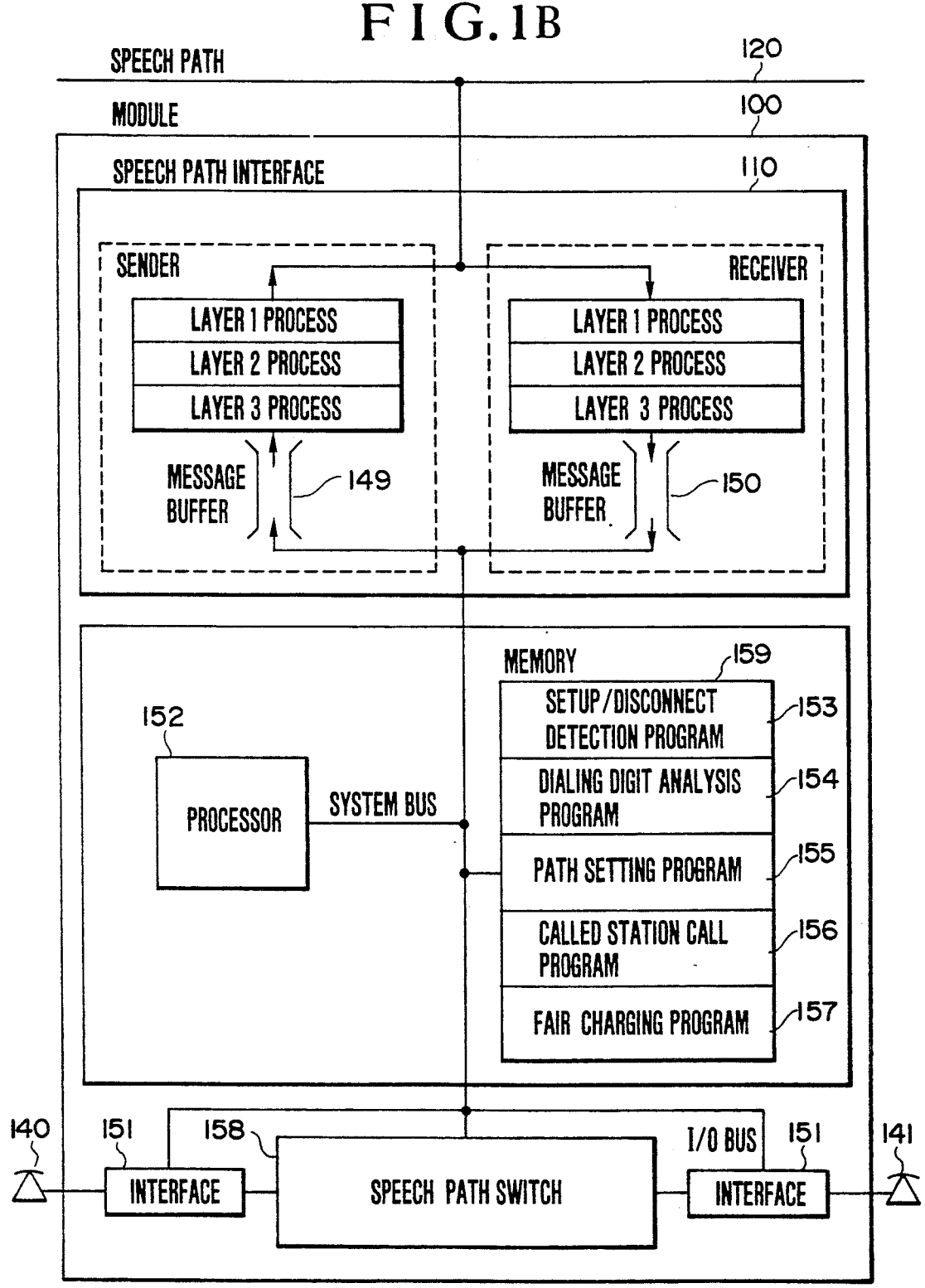
FIG. 1B shows a configuration of a module 100 of the node shown in FIG. 1A.

Further details of the module 100 are shown in FIG. 1B. In a newest model of an electronic switcher, the functions 130-134 in the module 100 of FIG. 1A are, in many cases, implemented by a combination of special hardware, a processor and special software. An interface 151 accommodates subscribers 140 and 141 and it is usually called a subscriber circuit.

The functions in the module 100 of FIG. 1A are explained in comparison with FIG. 1B. The setup/disconnect detector 130 of FIG. 1A comprises an interface 151, a processor 152 and a setup/disconnect detection program 153. An on/off hook status of the subscriber is converted to 0/1 logical information by the interface 151, and the setup/disconnect of the subscriber is detected by the processor 152 and the setup/disconnect program 153 based on the 0/1 logical information. The dial digit analyzer 131 of FIG. 1A comprises the interface 151, the processor 152 and a dial digit analysis program 154. The interface 151 receives a dialing signal (for example, a PB signal) from the subscriber and converts it to a 0–9 BCD code. The digits are stored by the processor 152 and the dialing digit analysis program 154 operates to analyze the digits in accordance with a numbering scheme. The path setting unit 132 of FIG. 1A comprises a speech path switch 158, the processor 152 and a pass setting program 155. It determines an accommodation position of the received subscriber and determines a post number of a corresponding switch to close the speech path switch 158. The called station call unit 138 of FIG. 1A comprises the interface 151, the processor 152 and a called station call program 156. It sends a call signal to the called subscriber through the interface 151 and detects a response from the called subscriber. The fair charging unit 134 of FIG. 1A comprises the processor 152 and a fair charge program 157. It writes fair charge information into a fair charge memory (not shown) provided for each subscriber.

The module 101 has a number conversion unit 136 which is an additional service providing function. For example, when a calling station dials a number "000-123456" in which "000" is a representative of the fact that the dialed number is an identification number assigned to a corporation, such as an additional service identification number, and "123456" is the identification number assigned to the corporation, the number conversion unit 136 converts the identification number to a telephone number of a branch office which is closest to the calling station. For example, when the calling station is in New York, the number is converted to a branch office in New York, and when the calling station is in Los Angels, the number is converted to a branch office in Los Angles.

Figure 1C:
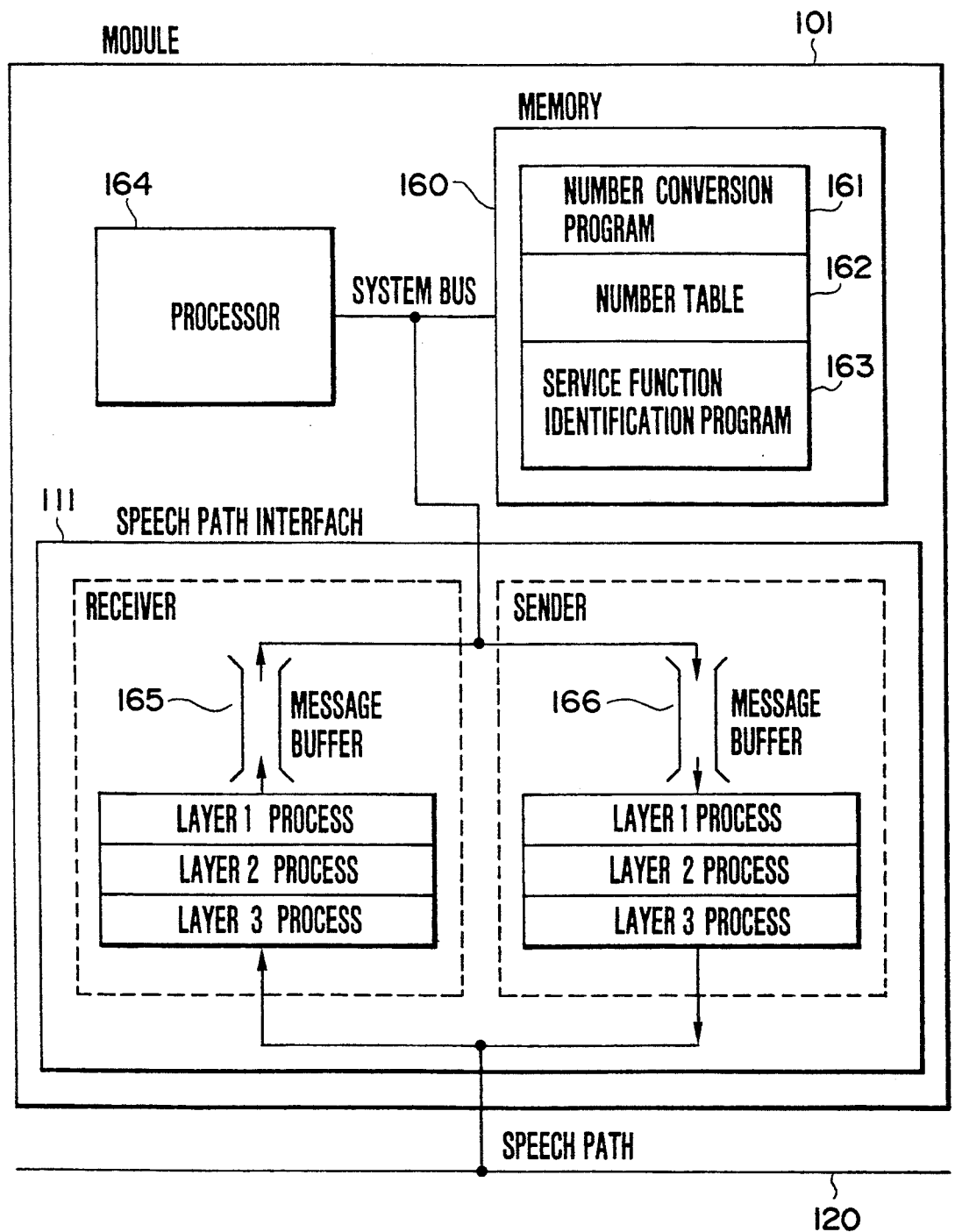
FIG. 1C shows a configuration of a module 101 of the node shown in FIG. 1A.

FIG. 1C shows a detail of the module 101. A number conversion unit 136 in the module 101 of FIG. 1A comprises a processor 164, a number conversion program 161 and a number table 162. The processor 164 looks up the number table 162 in accordance with an algorithm defined by the number conversion program 161 to convert the number.

The module 102 has a different additional service providing function than that of the module 101, although it is not explained here.

A typical operation of the node of FIG. 1A is explained.

It is assumed that a calling station 140 dials the identification number assigned to the corporation and the call is received by a terminal 141 at a branch office of the corporation which is closest to the calling station in the same module 100.

When the calling station 140 calls, the setup/disconnect detector 130 detects the call of the calling station 140 in a step A1 of the flow chart of FIG. 2. Then, when the calling station 140 dials the identification number assigned to the corporation, the dialed digit analyzer 131 analyzes the dialing digits in a step A2 to determine whether it is a call to request an additional service or not. If the additional service is not requested, the process jumps to a step A5 where a path is set to a terminal corresponding to the telephone number which the calling station dialed.

If the additional service is requested, the call for the additional service requested is identified by the additional service identification number "000". Since the module 100 has no additional service providing function, the service is requested also knows module.

In this case, in the prior art, the service requesting module 100 knows that the number conversion unit 136 which provides the service is in the module 101 and also known the relationship between the logical address and the physical address of the module 101. Accordingly, as shown in the flow chart of FIG. 3, it is necessary to execute a step B1 for converting the logical address of the service providing unit which is used in the module 101 to a physical address. In order to execute the step B1, the problems described herein with respect to the prior art arise.

On the other hand, the operation of the module 101 in accordance with the present invention is shown in FIG. 2. In accordance with the present invention, as shown in a step A3 of FIG. 2, the additional service request is sent out in a broadcast fashion without converting the logical address to a physical address. (The term "broadcast fashion" herein used means a fashion in which communication is made to all modules without specifying destination stations in a system having the modules interconnected through the common speech path 120 shown in FIG. 1A. An example thereof is the Braodcast shown in the CCITT Recommendation Q. 920, FIG. 71Q. 920.) For this request, a module which can provide the corresponding additional service sends back a response, for example, corresponding additional service data. In the mode of FIG. 1A, the module 101 sends back the response, and the number conversion unit 136 converts the identification number "123456" assigned to the corporation which the calling station 140 dialed, to a telephone number of the terminal 141 at a branch office which is closest to the calling station, and the converted telephone number "03-987-6543" is sent back to the module 100. When the module 100 receives the telephone number, it sets a path in accordance with the telephone number "03-987-6543" in a step A5. It sets a path between the calling station 140 and the terminal 141 at the branch office which is closest to the calling station 140 (telephone number "03-987-6543").

The operation is further explained with reference to FIGS. 1B and 1C. In the module 100 of FIG. 1B, if the requirement of a specific service function is decided as a result of the analysis of the dialing digits by the dialing digit analysis program 154, the processor 152 assembles an "additional service request" and sends it out through the communication line interface 110. The "additional service request" is received by the module 101 of FIG. 1A through the communication line interface 111. The processor 164 and a service function identification program 163 in the memory 160 determine whether the requested function is capable of being serviced in its own module, and if it is, the processor 164 looks up the number table 162 in accordance with an algorithm defined by the number conversion program 161 to convert the number, and responds to the module 100 through the communication line interface 111 and the speech path 120.

Figure 3:
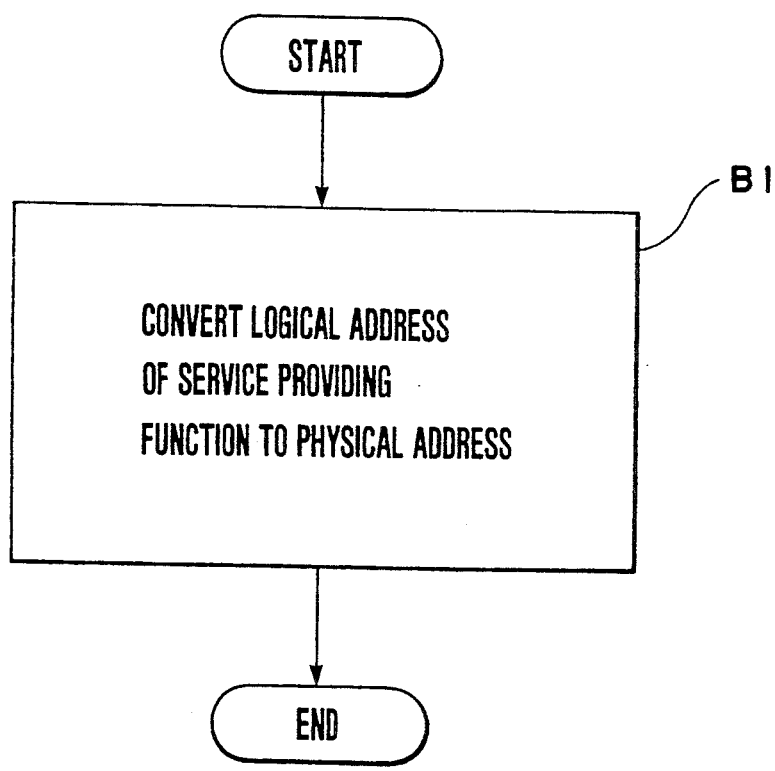
FIG. 3 shows a flow chart illustrating necessary functions in prior art.

In accordance with the present invention, it is not necessary to execute the step for identifying the destination module, that is, the step B1 shown in FIG. 3, but a simple function of sending out the additional service request to the communication line 120 is all that is required in each module.

It is needless to say that a function to identify whether the additional service request received is capable of being serviced in that module or not should be provided in the module which provides the additional service, whether in accordance with the present invention or in accordance with the prior art.

Means for sending and receiving an additional service request in each module is now explained with reference to FIGS. 1B and 1C. In FIG. 1B, when the additional service request is to be sent out, the processor 152 assembles an "additional service request" message in accordance with the content of the dialing digit analysis program 154. The message is stored in a message buffer 149. The speech path interface 110 reads out the message from the message buffer 149, processes it in accordance with the process for the layers 1-3 of the LAN protocol defined in IEEE 802, and sends it out to the speech path 120. In FIG. 1C, when the additional service request is to be received, the message received through the speech path 120 is processed by the speech path interface 111 in accordance with the process for the layers 1-3, and it is temporarily stored in the message buffer 165. Thereafter, the processor 164 reads out the message.

In another embodiment of the present invention, a selection function module having service providing function arrangement information of another node is provided in each node, and the additional service request is sent out in a broadcast fashion or another fashion. In the present configuration, when the module having the desired additional service providing function is in another node, the selection function module detects that the additional service providing function is in the other node and sends back a response in place of the service providing function which is in the other node. In accordance with the present configuration, the speed of the response to the service request is increased. A similar effect will be attained by scanning the modules by the selection function module to send back a response when it detects the additional service request. Further, where the selection function module has a function for determining a module having the desired additional service providing function of another node and routing to that module, an invalid communication between nodes can be reduced.

A second embodiment of the present invention is explained with reference to FIGS. 4A, 4B and 5.

Figure 4A:
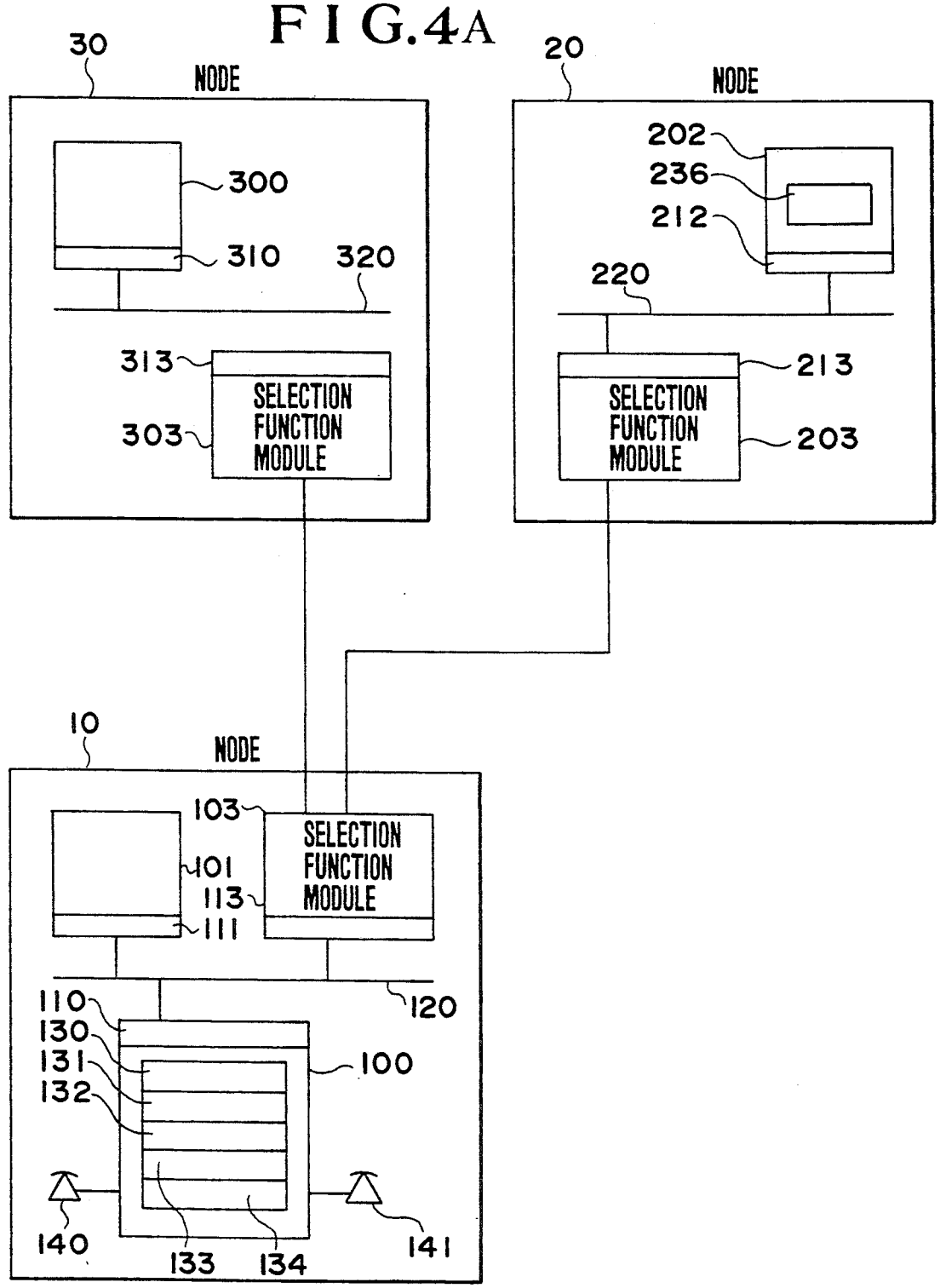
FIG. 4A shows a configuration of a network having a plurality of nodes interconnected.

FIG. 4A shows a configuration of nodes and among nodes. Modules 100-101 and 103 of a node 10 are interconnected by a communication line 120 as they are in FIGS. 1A and 1B. Modules 202-203 of a node 20 are interconnected by a communication line 220, and modules 300 and 303 of a node 30 are interconnected by a communication line 320. Other modules are also connected to the communication lines 120, 220 and 320 although they are not shown.

Numerals 110-111, 113, 212-213, 310 and 313 are communication line interfaces. Numerals 103, 203 and 303 denote selection function modules. The node 10 of FIG. 4A corresponds to the node shown in FIG. 1A. In FIG. 4A, the effect mentioned in connection with the first embodiment of the present invention can be attained without the selection function modules 103, 203 and 303. However, where the desired additional service module is in another node which is distant, it takes time before a response is sent back from the destination module so that the requesting module may be kept waiting or invalid communication increases in a larger scale network because the service request is sent out to modules which do not have the desired service providing function. This trend is remarkable when the service request is sent out in a broadcast fashion. The speed of response to the request can be increased and the possibility of invalid communication can be reduced by providing the selection function module 103, 203 or 303 having the service providing function arrangement information of another node in each node, and when the module having the desired additional service providing function is in another node, detecting by the selection function module 103, 203 or 303 that the additional service function is in the other node and sending back the response in place of the service providing function of the other node. In this manner, the undesirable waiting by the requesting module is eliminated.

The invalid communication between the nodes can be reduced by providing to each of the selection function modules 103, 203 and 303 a function to determine the module having the desired additional service function of another node and routing the service request.

Figure 4B:
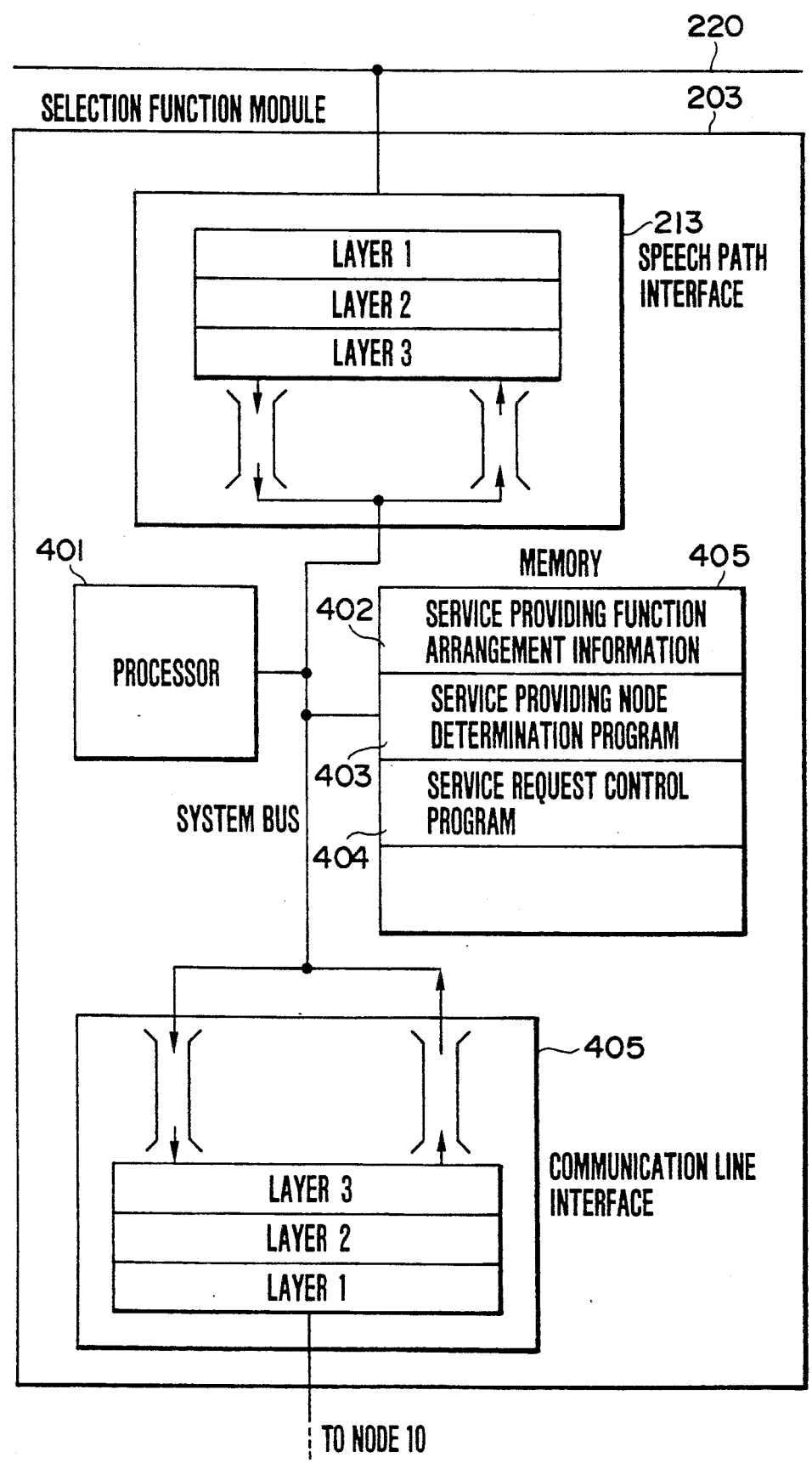
FIG. 4B shows a configuration of a selection function module 203 in the node 20 of FIG. 4A.

A configuration of the selection function module 203 of FIG. 4A is shown in FIG. 4B. The selection function module 203 comprises speech path interfaces 213 and 406, a processor 401 and a memory 405. The processor 401 starts service providing function arrangement information 402 in the memory 405, and a service request control program 404, determines a module having a desired additional service providing function of another node, and routes it.

The operation of the present embodiment is now explained. Let us consider a similar number conversion to that in the first embodiment. It is assumed that, in FIG. 4A, the calling station 140 dials the identification number "000-123456" assigned to the corporation and it is received by the terminal 141 having the number "03-987-6543" at a branch office of the corporation which is closest to the calling station in the same node 10. What is different from the first embodiment is that the number conversion unit 136 in the module 101 of FIG. 1A is not in the same node 10, but is in the module 202 of another node 20 in the form of a number conversion unit 236.

When the calling station 140 calls, the call/ disconnection detector 130 detects the call of the calling station 140 in the step A1 of the flow chart of FIG. 2. When the calling station 140 dials the identification number assigned to the corporation, the dialing digit analyzer 131 analyzes the dialing digits in the step A2 to determine whether it is a call to request additional service or not. If it is determined that a additional service has been requested by the additional service identification number "000", the additional service request is issued, for example in a broadcast fashion in the step A3. The present invention is not limited to the broadcast fashion, as it is not in the first embodiment.

Because there is no module in the node 10 which has the corresponding additional service providing function, the selection function module 103 having the service providing function arrangement information of other nodes refers the service providing function arrangement information of the other nodes in the step C1 of the flow chart of FIG. 5 to determine whether the received additional service request is one to the service providing function which is present in another node or not. If the decision is that the request is to its own node, the response to the request is not sent back. However, if it is a request to the service providing function which is present in another node, the selection function module 103 sends back the response to the service requesting station in the step C2. The response is received by the module 10 in the step A4 of FIG. 2.

The time from the step A3 to the step A4 in FIG. 2 can be reduced by sending back the response to the service request for the service providing function of the other node by the selection function module 103. Accordingly, the undesirable waiting of the module 10 can be eliminated. Further, the selection function module 103 determines the module which has the desired additional service providing function of the other module in the step C3 in FIG. 5, and routes the additional service request in the step C4 so that the invalid communication due to the communication over a wide network is reduced.

For example, in the step C4, the logical address of the service destination station in the service request packet sent from the service requesting station in the broadcast fashion is converted to the physical address assigned to the module 202 of the node 20 so that the additional service request is routed and the service is provided from the desired additional service providing function.

Thereafter, the service is provided by the desired additional service providing function. In the second embodiment, the number conversion unit 236 converts the identification number "123456" assigned to the corporation which the calling station 140 dialed from the module 202 of the node 20 having the number conversion function 236 as in the first embodiment, to the telephone number, for example, "03-987-6543" of the terminal 141 of the branch which is closest to the calling station, and the telephone number is sent back to the module 100. When the module 100 receives the telephone number "03-987-6543", it sets a path in accordance with the telephone number to set the path between the calling party 140 and the terminal 141 at the branch office.

In the step C4 of FIG. 5, the communication between the routing of the additional service request and the reception by the module 100 of the telephone number "03-987-6543" of the terminal 141 at the branch office which is closest to the calling station may involve the selection function module 103 first routing the additional service request to the node 20, where the selection function module 203 receives the request, routes it in the node 20 and sends out the additional service request to the module 202, and the module 202 communicates with the module 103. Alternatively, the selection function module 203 receives the service request from the module 103 by internode broadcast, and sends it back to the selection function module 103 so that the communication is made between the selection function modules 103 and 203. It is possible that the selection function module 103 directly transfers the service request to the module 202 for communication. The present invention is applicable to any of the above methods.

In a public network, such as a subscriber telephone network, most nodes or telephone stations have only the basic functions for telephone switching, such as a setup/disconnect detector, dialing digit analyzer and path setter as shown by the module 100 of FIG. 1A, and the additional service providing function such as the number conversion unit is centrally located in the center node or additional service providing station.

Figure 6:
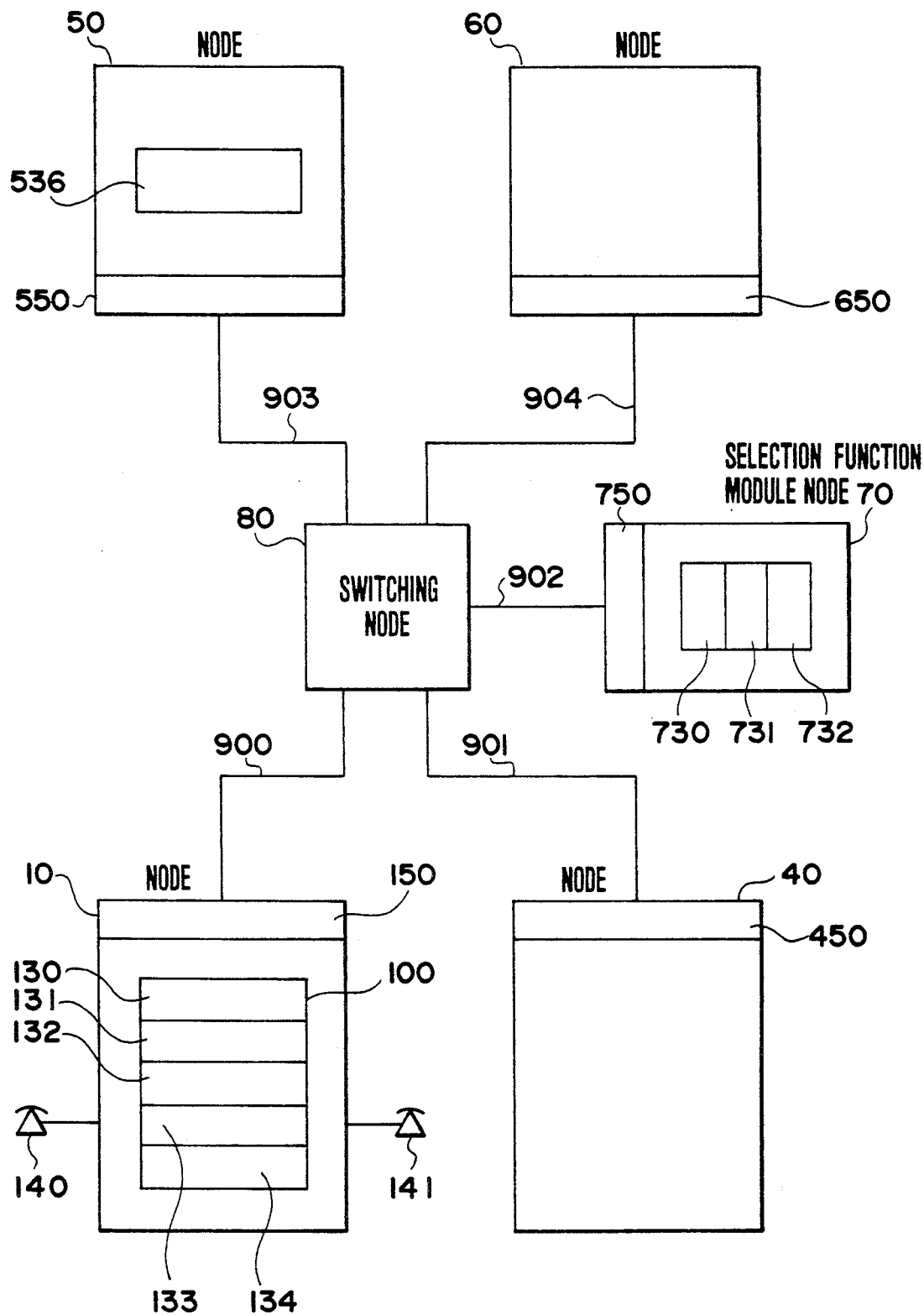
FIG. 6 shows a configuration of a network having an additional service providing function centrally located at a center node.

FIG. 6 shows a configuration of a third embodiment of the present invention applied to such a network.

A node 10 has a module 100 which comprises a setup/disconnect detector 130, a dialing digit analyzer 131, a path setter 132, a called station call unit 133, a fair charging unit 134. A node 40 also has basic functions (not shown) which are similar to those of the node 10.

A node 50 corresponds to the node 20 of FIG. 4. It comprises a module 536 which has an additional service providing function. A node 60 also comprises a module (not shown) which has an additional service providing function. A node 70 comprises a selection function module having means 730 for storing service providing function arrangement information of other nodes, means 731 for determining a node which has a service providing function corresponding to the service request, and means 732 for sending out the service request to the node which has the service providing function. A node 80 is a switching node which is connected to communication line interfaces 150, 450, 550, 650 and 750 of the nodes 10 and 40–70 through communication lines 900–904 to switch information among the nodes.

The operation of the third embodiment is explained with reference to FIGS. 7 and 8. Let us consider a similar number conversion to that in the first and second embodiments. It is assumed that, in FIG. 6, the calling station 140 dials the identification number assigned to the corporation, for example, "000-123456" and it is received by the terminal 141 having the telephone number "03-987-6543" at the branch office of the corporation which is closest to the calling station in the some node. However, it differs from the first and second embodiments in that one selection function module is provided in common to the plurality of nodes instead of one module for each node.

The steps from the call by the calling station 140 to the determination whether it is a call to request the additional service are similar to the steps A1 and A2 in the flow chart of FIG. 2.

Figure 7:
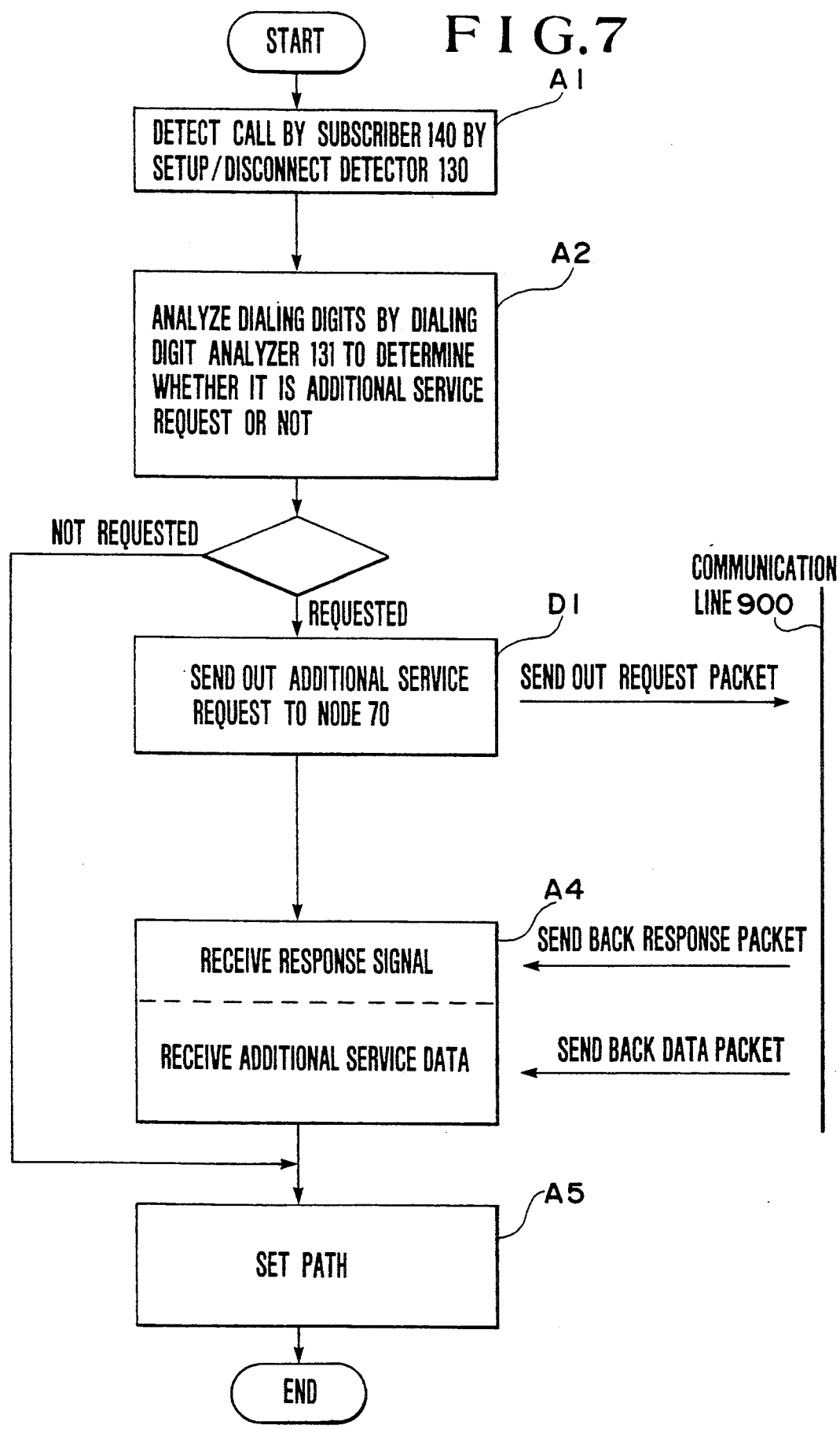
FIGS. 7 and 8 show flow charts for explaining an operation of an embodiment of the present invention in the network shown in FIG. 6.
Figure 8:
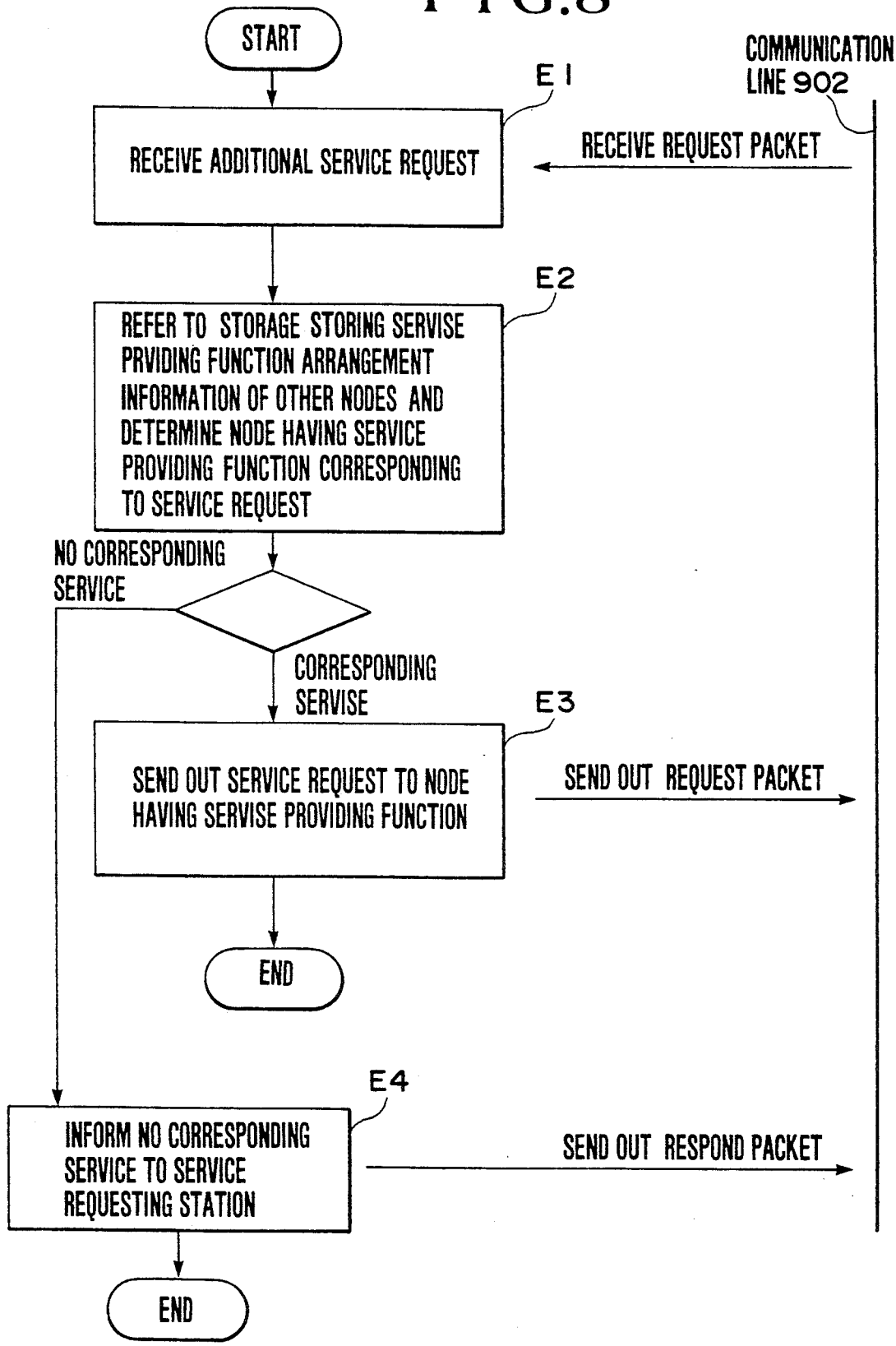

When it is determined that the additional service has been requested by the additional service identification number "000", the additional service request is sent to the node 70, which has the selection function module, in the step D1 of FIG. 7. Accordingly, like in the previous embodiments, it is not necessary that the service requesting station knows the module which has the desired service providing function or the relationship between the logical address and the physical address of the node, but the additional service request may be sent to the node which has the selection function module. Since the selection function module is provided in common to the plurality of nodes, the addition, deletion and modification operations of the service providing function arrangement information due to the addition, deletion and modification of the service providing function are reduced compared to a case where the selection function module is provided for each node, particularly in a network having a number of nodes and service providing functions, such as a public network.

The additional service request sent to the node 70 is switched by the switching node 80 and reaches the node 70. In the node 70, the means 730 for storing the service providing function arrangement information of other node is referred to in the step E2 of the flow chart of FIG. 8 for the additional service request, and the service providing node determination means 731 corresponding to the service request determines the physical address of the node which has the desired service providing function. In the step E3, the service request is sent out from the service request send-out means 732 to the node which has the desired service providing function. After the service request has been sent out of the node 70, it is switched by the switching node 80 and reaches the node 50. In the node 50, the number conversion unit 536 converts the identification number "123456" assigned to the corporation which the calling station 140 dialed to a telephone number, for example, "03-987-6543" of the terminal 141 at the branch office which is closest to the calling station, and sends back the telephone number to the module 100 directly or through the node 70. When the module 100 receives the telephone number "03-987-6543", it sets a path between the calling station 140 and the terminal 141 of the branch office in the steps A4 and A5 of FIG. 2 as it does in the first embodiment.

In the flow chart of FIG. 7, the response packet and the data packet are received separately in the step A4, although the response packet may be combined with the data packet.

Figure 9:
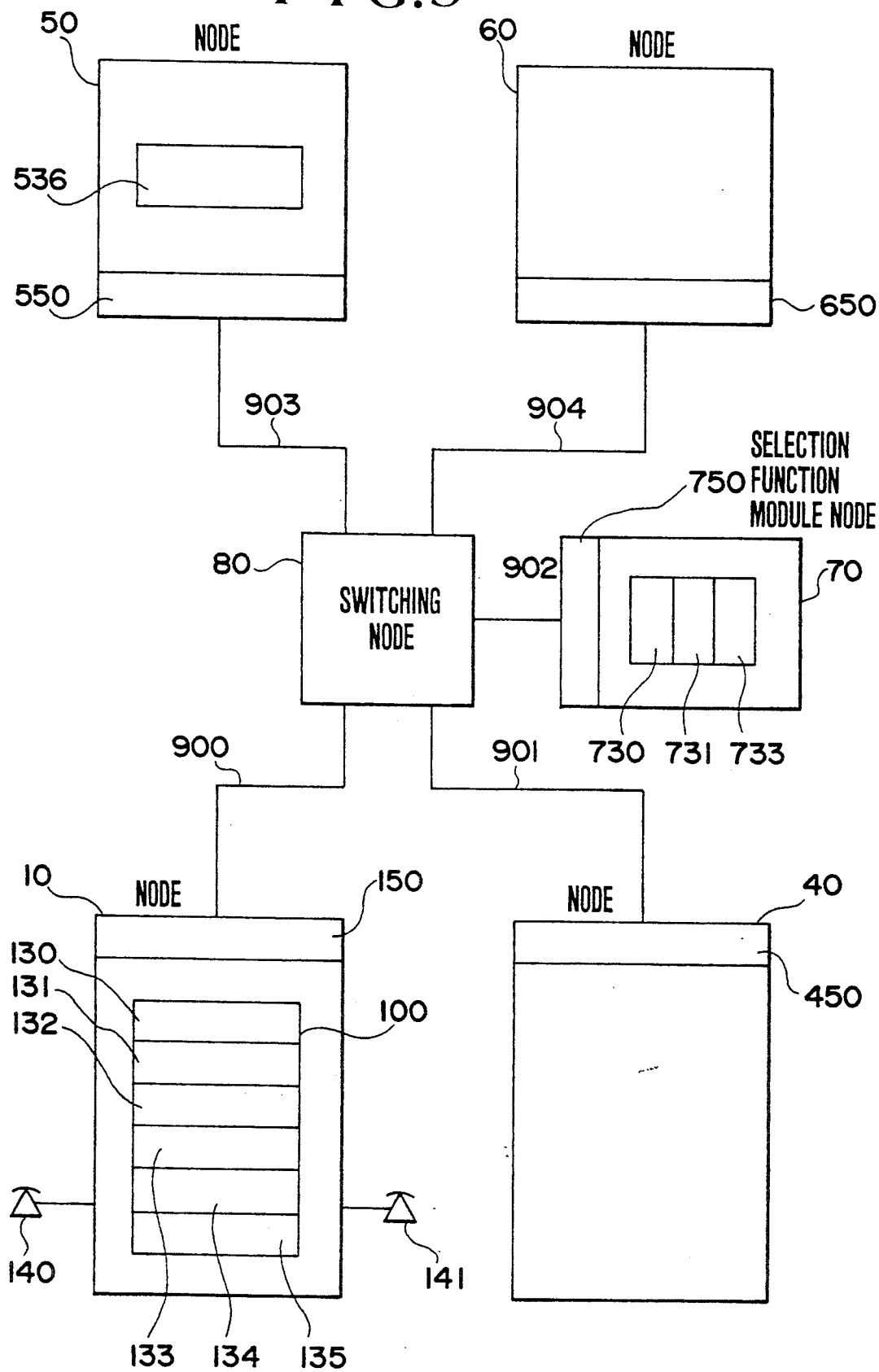
FIG. 9 shows a configuration of a network having a common selection function module for a plurality of nodes.

FIG. 9 shows a fourth embodiment which is different from the third embodiment and in which a selection function module is provided in common to a plurality of nodes. It is different from the former embodiment of FIG. 6 in that a node 70 which has the selection function module has means 733 in this embodiment instead of the means 732. This means 733 sends information for designating a node which has the desired service providing function back to the service requesting station, although of the means 732 sends out the service request to send the service request to the node which has the desired . service providing function in FIG. 6. Further it is different from the FIG. 6 embodiment in that the service requesting station, that is, the node 10 in the present embodiment has means 135 for receiving information for designating the node which has the desired service providing function, assembles a service request such as a request packet to be sent out to the node which has the desired service providing function, based on the above information, and sends out the service request such as a request packet to the node which has the desired service providing function. The operation which is different from that of the previous embodiment is explained with reference to the flow charts of FIGS. 10 and 11 which are used to explain the operation of FIG. 9. When the node 70 receives the additional service request, it sends the information for designating the node which has the desired service providing function among the nodes determined in the step E2 of FIG. 11 back to the service requesting station, that is, the node 10 in the present embodiment, in the step G1 of FIG. 11. When the service requesting station, that is, the node 10 receives the information, it assembles a service request such as a request packet to be sent to the node which has the service providing function, in a step F2 of FIG. 10, and sends out the service request such as the request packet to the node which has the desired service providing function in a step F3 of FIG. 10. The request packet passes through the communication line 900, is switched by the switching node 80, and transmitted to the node 50 which has the desired service providing function, that is, the number conversion unit 536, through the communication line 903. As explained in the previous embodiment, the number conversion unit 536 converts the identification number "123456" assigned to the corporation to the telephone number "03-987-6543" of the terminal 141 which is closest to the calling station, and sends the telephone number back to the node 10 which is the service requesting station. When the node 10 receives the telephone number, it connects the calling station 140 and the terminal 141 in the steps A4 and A5 of FIG. 10, as explained in the previous embodiment.

In accordance with the present invention, when service is requested to another module, it is not necessary for each module to have a function to determine the module to which the request is to be issued, and a method for providing network service which can flexibly conform to the addition or modification of modules is provided. Even if the desired module is in another node, the speed of response to the request is increased and the undesirable waiting of the requesting module is eliminated. The possibility of invalid communication between nodes is also reduced.

We claim:

1. A method for providing network service in addition to call processing functions including at least switching of calls in a communication system including a plurality of modules mutually connected via a communication line, comprising the steps of:

sending out from a service requesting module to other modules via said communication line a service function request command for requesting a particular service function to process a call when said service requesting module does not have the capability to execute said requested particular service function;

receiving in each of the other modules via said communication line the service function request command sent out from said service requesting module to determine whether the respective module has the capability to execute the requested particular service function;

sending from each of the other modules which have the capability to execute the requested particular service function a service function response command back to the service requesting module via said communication line indicating that the requested particular service function is capable of being executed thereby; and executing, after said step of sending said service function response command, said requested particular service function in each of the other modules which have sent a service function response command and thereafter sending information derived by executing the requested particular service function back to the service function requesting module.

2. A method for providing network service in addition to call processing functions including at least switching of calls in a communication system comprising a plurality of nodes each including a plurality of modules connected to each other via a communication line, comprising the steps of:

sending from a service requesting module in one node a service function request command for requesting execution of a particular service function for processing a call to each of the other of said plurality of modules in said one node via said communication line when said service requesting module does not have the capability of executing said requested particular service function;

receiving the service function request command in a selection function module in said one node which has service function arrangement information identifying whether other nodes have modules which have the requested particular service function; and sending, in response to said service function request command, a service function response command from the selection function module back to the service requesting module when a module of at least one of the other nodes has the requested particular service function execution capability, wherein said sending of a service function response command indicates to the service requesting module that the requested particular service function execution capability is included in a module of at least one of the other nodes.

3. A method for providing network service in addition to call processing functions including at least switching of calls in a communication system comprising a plurality of nodes connected to each other via a communication line, each node including a plurality of modules, comprising the steps of:

sending a service function request command for requesting execution of a particular service function for processing a call from a service requesting module to a selection function module operating in common to said nodes, said selection function module having service function arrangement information identifying other nodes in said communication system which have a capability of executing said requested particular service function;

receiving in the selection function module the service function request command to determine whether there is a node in said communication system having the capability of executing the requested particular service function; and sending, in response to said service function request command, from the selection function module a service function response command back to the service requesting module when at least one node in said communication system has the requested service function execution capability, wherein said sending of a service function response command indicates to the service requesting module that there is at least one node in the communication system having the requested service function execution capability.

4. A method for providing network service according to claim 2 further comprising the step of:

sending from the selection function module information designating nodes having the service function execution capability back to the service requesting module via said communication line.

5. A method for providing network service according to claim 3 further comprising the step of:

sending from the selection function module information designating nodes having the service function execution capability back to the service requesting module via said communication line.

6. A method for providing network service according to claim 2 further comprising the steps of:

determining by the selection function module the nodes providing the service function execution capability; and sending from the selection function module a service function request command to the determined nodes via said communication line.

7. A method for providing network service according to claim 3 further comprising the steps of:

determining by the selection function module the nodes providing the service function execution capability; and sending from the selection function module a service function request command to the determined nodes via said communication line.

8. A module having a call processing function including at least switching of calls for communicating with a plurality of other modules having the call processing function via a communication line, comprising:

a channel switch for connecting between subscribers;

a storage for storing therein a call processing program for processing a call at said channel switch and a control program for controlling provision of a service for the modules; and a processor for sending, in accordance with said control program, a service function request command to said communication line to another module to execute a particular service function, receiving information from said another module which executed said particular service in response to said service request command and executing call processing to process a call for said channel switch in accordance with said information from said another module and said call processing program.

9. A module having a call processing function including at least switching of calls for communicating with a plurality of other modules having the call processing function via a communication line, comprising:

a storage for storing therein at least one service function program necessary for executing a service function for said other modules, an identification program for identifying service functions of said module itself and a control program for controlling provision of services among the modules; and a processor for receiving a service request command requesting execution of a particular service function from said communication line, said service request command being sent by one of said other modules, identifying by use of said identification program whether said module has a capability for executing said particular service function requested by said service request command, executing, in response to said service request command, said requested particular service function when said module has said service function execution capability and thereafter sending information derived from the executed requested particular service function to said communication line back to said one module which sent said service request command.

10. A communication line system including a plurality of nodes each having a plurality of modules having a call processing function including at least switching of calls or an additional service function and being connected to each other, comprising:

a plurality of modules connected via a communication line for sending out service function request commands, requesting execution of particular service functions for processing calls, to said communication line; and one or more modules connecting said plurality of nodes for receiving a service function request command from said communication line connecting said plurality of modules sending out said service function request commands, determining whether a service function execution capability is in any one of said plurality of nodes in accordance with service function arrangement information included in each of said plurality of nodes, sending said service function request command to a node having the service function execution capability when said node has said service function execution capability in accordance with a result of said determination and thereafter sending information derived from execution of said requested service function.

11. A communication system according to claim 10, wherein said one or more modules is connected to a node connected to said plurality of modules via said communication line.

12. A communication system according to claim 10, wherein said one or more modules are modules connected to each other via said communication line.

* * * * *